INVENTOR.
LOUIS F. LANGER
ATTORNEYS

Nov. 18, 1941.   L. F. LANGER   2,263,424
SELF-TAPPING SCREW
Filed Aug. 14, 1940   2 Sheets-Sheet 2

INVENTOR.
LOUIS F. LANGER
BY
Kwis Hudson & Kent
ATTORNEYS

Patented Nov. 18, 1941

2,263,424

UNITED STATES PATENT OFFICE 2,263,424

SELF TAPPING SCREW

Louis F. Langer, Wickliffe, Ohio, assignor to The National Screw & Manufacturing Company, Cleveland, Ohio, a corporation of Ohio Application August 14, 1940, Serial No. 352,533

2 Claims. (Cl. 85—47)

This invention relates to self-tapping screws adapted for cutting threads in materials for which the present self-tapping screws are not adapted.

More particularly it is the aim of the invention to provide a screw which is effective for cutting threads in plastics many of which are utilized in the molding of hard bodies or units and are formed of material of such character, particularly as to toughness, that the tapping of holes in the plastics to receive screws is not feasible for the reason that the taps used for this purpose are very quickly destroyed so that the tapping cost is exceedingly high. My improved screw may be used to advantage in cutting threads in other materials, such as metal alloy castings for which the present self-tapping screws are not suited.

A further and more specific object is to provide a self-tapping screw having a novel form of pilot which is provided with sharp narrow cutting edges adapted to readily cut threads in the round hole molded in the material, the pilot with its cutting edges being so formed that there is a large chip space at the forward end of the screw, thus well adapting the screw for insertion in blind holes.

A still further object is to so form the screw that there is avoided the likelihood of the screw becoming unduly tight and binding as it is screwed down, thus eliminating the danger of breakage of the plastic or other unit into which the screw is inserted.

In one of its aspects, the invention relates to a construction and manner of forming the tapered pilot which for its whole length or for a portion of its length is slabbed so as to form opposite flat faces and two opposite edges on which thread-forming grooves and teeth are formed with sharp cutting edges which, as the screw is screwed in place, cut a thread in the wall of the hole formed in the material. The flat faces and cutting edges may extend the full length of the pilot or may extend from the body of the screw down for a portion of the length of the pilot with its outer end rounded so as to form a round pilot end in order that the screw will stand more erect or be less likely to tip when first inserted in the hole.

In another aspect, the invention resides in reducing the outside diameter of the screw in a direction from the pilot toward the head so as to avoid binding of the screw and breakage of the unit when the screw is screwed down.

The invention may be further briefly summarized as consisting in certain novel details of construction and combinations and arrangements of parts as well as steps of the improved method which will be described in the specification and set forth in the appended claims.

In the accompanying sheets of drawings showing two forms of my invention,

Figure 8:
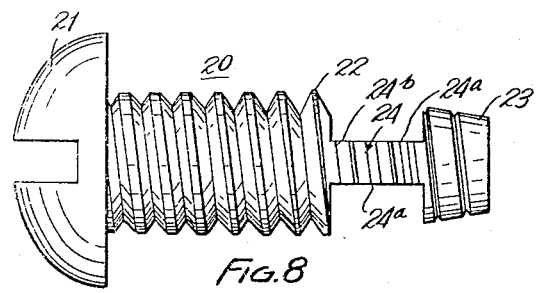
Fig. 8 is an elevation of the screw of Figs. 2, 6, and 7 looking toward the edge of the flattened portion of the pilot.
Figure 7:
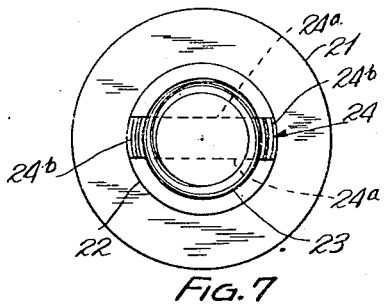
Fig. 7 is an end view of the screw shown in Figs. 2.
Figure 9:
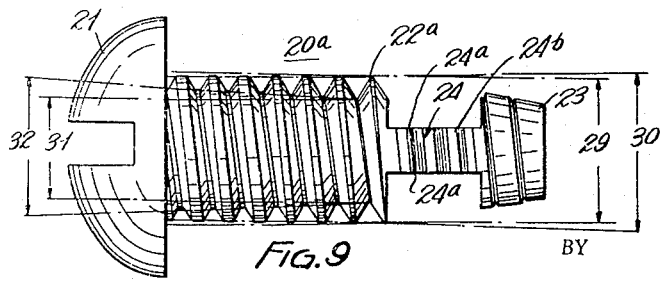
Fig. 9 is a view similar to Fig. 8 but with the reduction in the outside diameter of the screw from the pilot end of the body portion to the head formed in a different manner than in Fig. 8.
Figure 10:
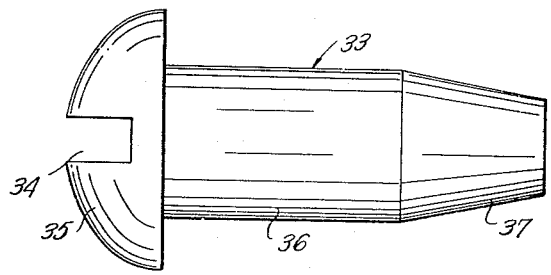
Fig. 10 is an elevation of a blank which is preferably used in forming the screws of Figs. 1 to 9, this view representing the first step in the process of producing the screws.
Figure 11:
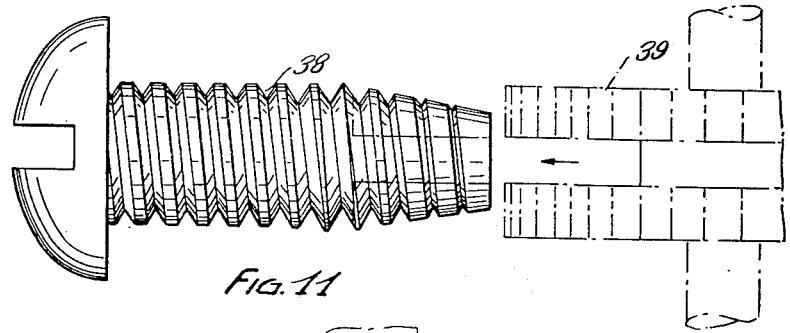
Figure 12:
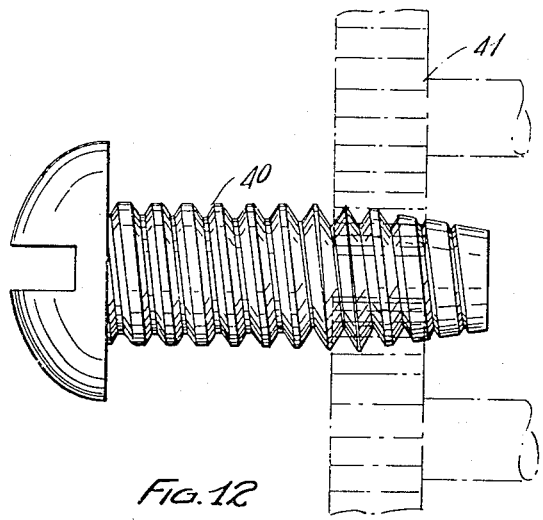

Fig. 11 shows the blank of Fig. 10 after the first thread-rolling operation and shows by dotted lines slabbing or cutting tools which may be utilized in the next operation for forming a screw with the pilot flattened or slabbed for its full length as illustrated in Figs. 1, 3, 4, and 5; and Fig. 12 is a similar view showing by dotted lines the slabbing or flattening tools utilized in producing a screw wherein the pilot is flattened for a portion of its length only, as illustrated in Figs. 2, 6, 7, 8, and 9.

Referring now to the drawings and first to Figs. 1, 3, 4, and 5, the screw here shown is designated as a whole by the reference character 15. It is provided with a head 16 which may be of any shape, a round headed screw being here illustrated provided with a screwdriver slot 17. It is provided also with a threaded body portion 18. In some instances the threaded body portion between the pilot and the head may be of uniform diameter but preferably it is of reduced diameter from the pilot to the head so as to avoid binding when the screw is screwed down. This reduction in outside diameter may be produced in different ways which will be referred to presently.

Figure 1:
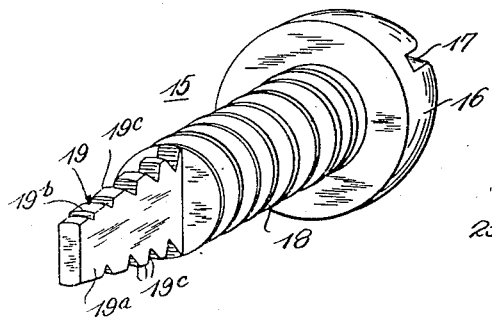
Fig. 1 is a perspective view of a screw having a pilot in accordance with the preferred form of the invention.

Additionally, the screw 15 of Fig. 1 has a pilot 19 in the form of a centrally disposed tongue with two opposite flat sides 19a and two opposite tapered threaded edges 19b. The thread is formed on the body portion and on the edges of the tongue by a thread-rolling operation, preferably two thread-rolling operations, so as to form perfect cutting edges on the pilot. Due to the taper of the tongue, the thread is of course of gradually increasing height and preferably becomes of full height at its inner end or at the junction with the body portion 18. This produces a series of cutting teeth on each edge of the tongue, each tooth having at the top and at the sides three sharp cutting edges designated 19c which have a shaving or thread-cutting action on the wall of the hole formed in the article which is to receive the screw. Thus the thread is completely formed by the pilot as the screw is progressively screwed into the hole, there being no or practically no thread-forming or cutting action by the thread on the body portion 18 of the screw.

At this point I will refer to the modified construction illustrated in Figs. 2, 6, 7, and 8. This screw is designated as a whole by the reference character 20 and is provided with a head 21 and a threaded body portion 22 which may be identical with the head 16 and body portion 18 of Fig. 1. The screw here illustrated differs from that shown in Fig. 1 in the shape or construction of the pilot which has a tapered round lower end 23 and between it and the body portion having a narrow centrally disposed tongue 24 the flat sides 24a corresponding to the flat sides 19a of Fig. 1 and with opposite tapered threaded edges 24b corresponding to the tapered threaded edges 19b of Fig. 1 forming cutting teeth each at the top and sides having sharp cutting edges 24c which by a shaving action form the thread in the wall of the hole in which the screw is to be inserted.

Figure 2:
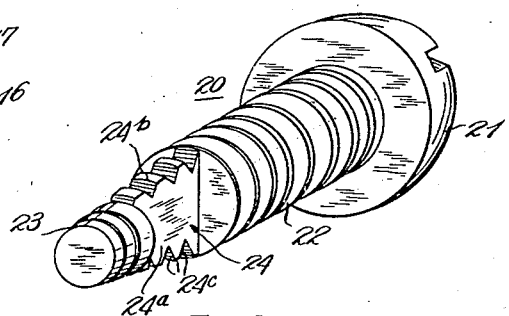
Fig. 2 is a view similar to Fig. 1 showing a modified form of pilot.

In the constructions shown in Figs. 1 and 2 the tapered flattened tongue or tongue portion with the rolled thread and sharp cutting edges not only cuts the thread in the wall of the hole in which the screw is inserted but the narrow tongue portion forms ample chip space which is very useful when the screw is being screwed into a closed or blind hole.

At this point it might be mentioned that to render this screw effective as a self-tapping screw, particularly when the article which receives the screw is formed of hard tough material, such as many plastics now being used, it is necessary that the screw be hardened, and this may be done by any of the usual hardening processes, such as cyanide-hardening, casehardening, and the like. After the hardening process, the screw may, if the use requires it, be plated with chromium or the like.

It was previously stated that it is one of the objects of the invention to avoid the likelihood of breakage of the plastic or other material into which the screw is inserted by gradually reducing the outside diameter of the threaded body portion of the screw from the pilot toward the head. The drawings show the screw threaded for its full length, i. e., up to the head, and the diameter of the threaded body portion is therefore reduced from the junction of the pilot with the body portion to the head. Of course, in some instances the body portion of the screw may not be threaded for its full length, but whether it is threaded entirely up to the head, as shown in the accompanying drawings, or partway to the head, the threaded portion may be gradually reduced in diameter for the full length of the threaded portion. It is to be understood, however, that in some instances this particular feature of my invention need not be utilized particularly if the screws are inserted in material not likely to break when the screw is screwed down.

This reduction in the outside diameter of the threaded body portion of the screw can be accomplished in two different ways, i. e., by tilting the thread-rolling dies or by grinding off and gradually reducing the height of the thread-forming ribs of the dies. The screws shown in Figs. 3 and 8 have the outer diameter of their threaded body portions reduced by tilting the dies. It will be noted by reference to these figures that the root of the valleys of the thread is V-shaped whereas the outer portions of the convolutions or turns of the thread are gradually reduced in diameter by being flattened with the flattening progressively greater from the pilot end of the body portion to the head. Additionally, it will be noted by reference to these same figures that as a result of tilting the dies not only are the outer portions of the turns or convolutions of the thread gradually reduced in diameter with the effect of being flattened with the flattening progressively increasing toward the head but the root diameter gradually increases from the pilot end of the body portion to the head.

Figure 3:
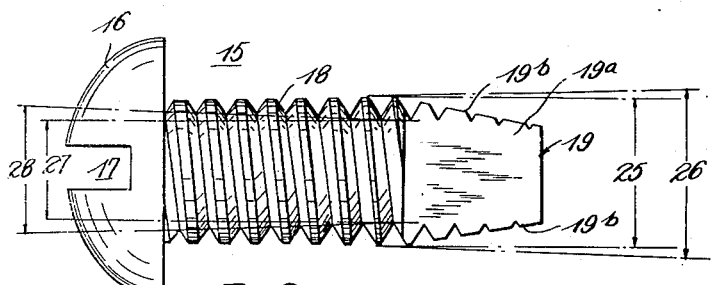
Fig. 3 is a side view of the screw of Fig. 1 looking toward one of the flat faces of the pilot.
Figure 4:
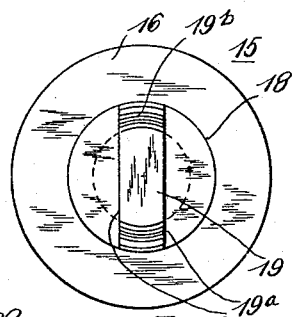
Fig. 4 is an end view of the screw of Figs. 1 and 3 looking toward the pilot.
Figure 5:
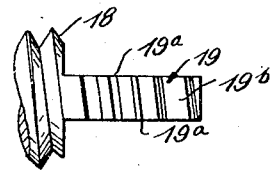
Fig. 5 is a fragmentary elevation of the pilot end of the screw of Figs. 1, 3, and 4 looking at the edge of the pilot.
Figure 6:
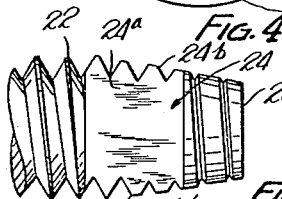
Fig. 6 is a fragmentary view of the pilot end of the screw of Fig. 2.

In Fig. 3 the normal outside diameter is designated by the two dotted parallel lines 25 and the taper of the gradual reduction in diameter from the pilot end of the body portion to the head is indicated by the dotted tapered lines 26. In this same figure at the lefthand side the normal root diameter is indicated by the two dotted parallel lines 27 and the gradual increase of the root diameter from the pilot end of the body portion to the head is indicated by the two dotted tapered lines 28.

The screw shown in Fig. 9 and here designated 20a is similar to screw 20 of Fig. 8 except as to the threaded body portion designated 22a. The other parts of the screw 20a similar to the screw 20 of Fig. 8 have been given the same reference characters as the corresponding parts of Fig. 8. The outside diameter of the threaded body portion 22a of the screw 20a has been reduced by rolling the thread with dies the ribs of which have been gradually ground off. The thread has a somewhat different form than in Fig. 8 in the respect that the bottom portion or root of the valleys as well as the outer portions of the turns or convolutions of the thread is flattened whereas in the case of the screw of Fig. 8, as noted above, the root or inner portion of the valleys is V-shaped. In Fig. 9 the normal outside diameter of the threaded portion is indicated by the parallel dotted lines 29. The taper of the threaded body portion is indicated by the dotted tapered lines 30. The normal root diameter is indicated by the dotted parallel lines 31, and the gradually increased root diameter from the pilot end of the threaded body portion to the head is indicated by the dotted tapered lines 32.

I have contemplated different ways of forming my improved screws herein illustrated. For example, I have considered forming by an extrusion or upsetting process a blank provided with my improved pilot either of the form illustrated in Fig. 1 or of the form illustrated in Fig. 2, and then threading the screw. However, it is not feasible to form a blank with my improved pilot with the most approved extruding or upsetting equipment. However, I do not regard this mode of procedure as impossible especially with improved equipment designed to function for this particular type of screw.

In the preferred method of making my improved screw the blank is formed by an extruding or upsetting process with an ordinary round tapered end. Then the thread is rolled on the blank, and after the threading operation the threaded screw is passed between a pair of suitable cutting tools for forming my improved pilot which tools may consist of a pair of milling cutters which produce a pilot either as shown in Fig. 1 or as shown in Fig. 2. This, however, leaves burrs at the narrow edges of the flat pilot or flattened portion of the pilot so that it becomes necessary, in order to form sharp thread cutting edges, to again pass the screw between thread-rolling dies. This "irons out" the portions of the thread at the edges of the flattened part of the pilot and produces the sharp cutting edges designated 19c in Fig. 1 and 24c in Fig. 2 so that they will be effective to cut the threads with a shaving action in tough material such as a plastic.

In Figs. 10, 11, and 12 I have illustrated the preferred process of making my improved screw except the first and second thread-rolling operations. In Fig. 10 is shown at 33 a blank which may be formed by an extrusion or upsetting process except the slot 34 in the head 35 which slot is generally sawed in the head after the blank has been formed. This blank has a cylindrically-shaped body portion 36 and a tapered pilot portion 37 round in cross-section. Next the thread is rolled on the blank by thread-rolling dies not shown, producing a blank which is threaded on the body portion 36 and on the pilot portion 37, this threaded blank being designated 38 in Fig. 11. In this instance I have shown a thread with its outside diameter reduced from the pilot to the head by tilting the dies as in Figs. 3 and 8, but of course the outside diameter may be reduced by grinding off the tops of the thread-rolling ribs of the dies so as to produce a thread such as illustrated in Fig. 9.

Next my improved pilot is formed by passing the threaded blank between a pair of suitable cutting tools, such as a pair of milling cutters. These cutting tools are indicated by dotted lines conventionally at 39 in Fig. 11 if the pilot is flattened for its full length as with the form of my invention illustrated in Figs. 1, 3, 4, and 5.

In Fig. 12 I have shown at 40 a threaded blank which in this instance has a thread similar to the thread illustrated in Fig. 9, and I have shown conventionally by dotted lines at 41 flattening or slabbing tools which, as before, may be in the form of milling cutters for forming a pilot flattened for a portion of its length only with its free end round in cross-section as in the form of the screw illustrated in Figs. 2, 6, 7, 8, and 9.

It is quite immaterial to my invention what kinds of tools are employed for forming the flattened pilot and how the threaded blanks are presented to the tools. In Fig. 11 the arrow at the righthand side of the figure indicates that the tools and threaded blank are moved relatively in a direction axially of the screw. In Fig. 12 the threaded blank and the pilot forming tools are moved relatively in a direction at right angles to the axis of the blank. These modes of slabbing the pilot are given by way of example only.

Then the screws are completed by again passing them between thread-rolling dies which remove the burrs from the pilot and form the sharp cutting edges. The two thread-rolling operations and the intermediate slabbing or pilot flattening operation do not require any manual handling of the articles for they are performed in a machine which automatically delivers the threaded blanks 38 from the first thread-rolling dies to the slabbing tools and then to the second pair of thread-rolling dies.

Thus it will be seen that the objects stated at the beginning of the specification are attained very effectively by my improved screw and process of forming it, and while I have disclosed the preferred forms of my invention and the preferred method of producing the screws, I do not desire to be confined to the precise details illustrated and described but aim in my claims to cover all modifications which do not involve a departure from the spirit and the scope of the invention.

Having thus described my invention, I claim:

1. A self-tapping screw comprising a body portion and a tapered pilot having a rolled thread thereon with the thread on the pilot forming a continuation of the thread on the body portion the pilot being slabbed after the thread-rolling operation and the thread being thereafter rerolled thereby providing sharp cutting edges on the pilot.

2. A self-tapping screw having a body portion and a tapered pilot with a rolled thread thereon, the thread on the pilot forming a continuation of the thread on the body portion, the pilot being slabbed after the thread-rolling operation thereby forming a relatively narrow tongue with opposite flat sides and threaded edges with cutting teeth thereon, and the thread thereafter being rerolled thereby providing sharp cutting edges on the teeth of the pilot.

LOUIS F. LANGER.